(12) United States Patent
Albulet et al.

(10) Patent No.: US 7,782,294 B2
(45) Date of Patent: *Aug. 24, 2010

(54) RF DATA COMPRESSION FOR A HIGH-SPEED MOUSE

(75) Inventors: Mihai Albulet, Redmond, WA (US); Gary Rensberger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

This patent is subject to a terminal disclaimer.

(21) Appl. No.: 11/157,726

(22) Filed: Jun. 21, 2005

(65) Prior Publication Data

US 2005/0237301 A1 Oct. 27, 2005

Related U.S. Application Data

(63) Continuation of application No. 10/392,029, filed on Mar. 19, 2003, now Pat. No. 6,995,750.

(51) Int. Cl.
 *G09G 5/00* (2006.01)
(52) U.S. Cl. ...................................................... 345/156
(58) Field of Classification Search ......... 345/156–167, 345/173–184
See application file for complete search history.

(56) References Cited

U.S. PATENT DOCUMENTS

| | | | | |
|---|---|---|---|---|
| 3,938,045 A | 2/1976 | Mathwich | ................. | 375/305 |
| 4,134,072 A | 1/1979 | Bolger | ................. | 327/106 |
| 4,754,268 A * | 6/1988 | Mori | ................. | 345/163 |
| 4,908,771 A | 3/1990 | Piot | ................. | 702/73 |
| 4,962,510 A | 10/1990 | McDavid et al. | ................. | 375/308 |
| 5,150,048 A | 9/1992 | McAuliffe et al. | ................. | 714/724 |
| 5,608,758 A * | 3/1997 | Sakuma et al. | ................. | 375/238 |
| 5,703,540 A | 12/1997 | Gazda et al. | ................. | 331/16 |
| 5,764,219 A | 6/1998 | Rutledge et al. | | |
| 5,765,113 A | 6/1998 | Russo et al. | ................. | 455/557 |
| 5,856,789 A | 1/1999 | Huang | ................. | 713/300 |
| 6,066,967 A | 5/2000 | Cahill et al. | ................. | 327/107 |

(Continued)

FOREIGN PATENT DOCUMENTS

JP     411205245 A     7/1999

OTHER PUBLICATIONS

U.S. Office Action dated May 17, 2005 cited in U.S. Appl. No. 10/392,029.

(Continued)

*Primary Examiner*—Sumati Lefkowitz
*Assistant Examiner*—Ke Xiao
(74) *Attorney, Agent, or Firm*—Merchant & Gould

(57) ABSTRACT

A pointing device is provided for reporting motion information about the pointing device. Counts representing movement in two dimensions are processed so that a packet data stream may accommodate the motion information. One aspect of the invention utilizes the value of count to determine whether compression of the motion information should be performed. When it is determined that compression should be performed, a compression function is selected, the count is processed by the compression function, and an indicator is set to indicate that the count is processed by the compression function. Reporting information, which includes the processed count and the indicator, is then transmitted to computer system. A user input interface that is associated with the computer system recovers the counts using appropriate inverse functions in accordance with the indicators.

16 Claims, 8 Drawing Sheets

U.S. PATENT DOCUMENTS

| | | | | |
|---|---|---|---|---|
| 6,144,369 | A * | 11/2000 | Shiga | 345/163 |
| 6,298,250 | B1 | 10/2001 | Nilsson | 455/569.1 |
| 6,624,629 | B1 | 9/2003 | Speier et al. | 324/303 |
| 6,995,750 | B2 * | 2/2006 | Albulet et al. | 345/170 |
| 7,158,580 | B1 | 1/2007 | Albulet | 375/285 |
| 7,336,705 | B2 | 2/2008 | Albulet et al. | 375/238 |
| 7,688,912 | B2 | 3/2010 | Albulet | |
| 2001/0027530 | A1 * | 10/2001 | Yen et al. | 713/300 |
| 2003/0210662 | A1 | 11/2003 | Rensberger et al. | 370/328 |
| 2004/0199829 | A1 | 10/2004 | Albulet et al. | |
| 2007/0081609 | A1 | 4/2007 | Albulet | |

OTHER PUBLICATIONS

U.S. Office Action dated Aug. 22, 2006 cited in U.S. Appl. No. 10/417,520.

U.S. Office Action dated Oct. 6, 2006 cited in U.S. Appl. No. 10/391,337.

U.S. Final Office Action dated Mar. 7, 2007 cited in U.S. Appl. No. 10/391,337.

U.S. Office Action dated Dec. 27, 2007 cited in U.S. Appl. No. 11/608,949.

U.S. Final Office Action dated Jul. 8, 2008 cited in U.S. Appl. No. 11/608,949.

U.S. Office Action dated Nov. 26, 2008 cited in U.S. Appl. No. 11/608,949.

Ken Gentile, "Fundamentals of Digital Quadrature Modulation," RF Design, Feb. 2003, pp. 40-47.

U.S. Final Office Action dated Aug. 19, 2009 cited in U.S. Appl. No. 11/608,949.

* cited by examiner

RF DATA COMPRESSION FOR A HIGH-SPEED MOUSE

This is a continuation of U.S. patent application Ser. No. 10/392,029 entitled "RF DATA COMPRESSION FOR A HIGH-SPEED MOUSE" filed Mar. 19, 2003. The parent application is incorporated herein by reference in its entirety.

FIELD OF THE INVENTION

The present invention relates to wireless pointing devices used with computers and other data input devices, and methods that may be used to report a change in position of the wireless pointing device.

BACKGROUND OF THE INVENTION

With the prior art, mechanical computer mice are typically specified to have a resolution of 400 dots per inch (dpi) and a maximum speed of 5 inches per second (ips), and may be tested before shipping to 7 ips. Some optical sensors within optical computer mice may be specified as having the same resolution as mechanical computer mice, but are capable of much higher speeds, such as speeds greater than 50 ips. Computer mice (both mechanical and optical), typically have resolution and speed limitation, in which no more than 7 bits of magnitude are needed to transmit the number of dots ($\Delta x$, $\Delta y$) counted during sampling intervals. For example, values from 0 through 127 can be represented in a 7-bit value and values in the range of $-128$ through 127 can be represented by a two's-complement value in 8 bits.

One particular prior art optical wireless computer mouse appears to send an 8 bit signed value (using a resolution of 800 dpi), indicating an amount of movement in each of a horizontal and vertical direction, via a radio frequency (RF) packet every 20 milliseconds, corresponding to a maximum mouse speed of about 8 ips. (50 RF packets per second (20 millisecond time intervals)×127 (maximum signed 8 bit value)×0.00125 inches per dot (800 dpi resolution)=7.9375 inches per second). Using a resolution of 400 dpi would yield a maximum speed of about 16 ips; however, the maximum tracking speed that a low speed USB device can support is 36 ips (at a 400 dpi resolution).

A ten-fold increase in speed, as may be attained by an optical mouse, means that displacement information ($\Delta x$, $\Delta y$ data) could have a magnitude up to ten times larger than the magnitude for prior art mechanical mice. Therefore, 4 additional bits, or 11 bits, would be required to report such a magnitude and 12 bits would be required to report 11 bits of magnitude and a sign bit.

With a wireless pointer device, e.g., a wireless high-speed mouse, displacement information that conveys movement of the wireless pointer device is typically transmitted on a packet data stream over a radio frequency channel. Of course, the faster the wireless pointer device can transverse, the number of bits that may be required to represent the movement increases. However, a user interface that receives this information may be limited in the amount of information that can be processed. For example, with a universal serial bus (USB) interface, packets are sent approximately every 8 msec, where each packet has a time duration of 8 msec or less. If additional bits are required to be transported over an existing packet structure, an increase of the duration of a packet may be necessary. However, restructuring the packet structure is not desirable and may increase the time latency. Hence, there is a real need to send displacement information from a wireless high speed pointer device so that the time duration of transmitted packets are not increased while a resulting error is maintained within an acceptable amount.

BRIEF SUMMARY OF THE INVENTION

The present invention provides method and apparatus for a pointing device, such as an optical wireless mouse, for reporting motion information about the pointing device. The present invention facilitates the support of high-speed pointing devices that require that an increased amount of motion information be transported over an existing structure of a packet data stream. With one aspect of the invention, counts representing movement in two dimensions are processed so that a packet data stream may accommodate the motion information. One aspect of the invention utilizes the value of count to determine whether compression of the motion information should be performed. When it is determined that compression should be performed, a compression function is selected, the count is processed by the compression function, and an indicator is set to indicate that the count is processed by the compression function. Reporting information, which includes the processed count (such as a numerical component) and the indicator (such as a flag component), is then transmitted to computer system over a wireless channel. Compression is configured in order to achieve a degree of compression, while limiting an inherent degree of error, so that motion information may be accommodated by a packet data stream, as may supported by a universal serial bus (USB) interface for the wireless channel.

With another aspect of the invention, a user input interface that is associated with the computer system recovers the counts using appropriate inverse functions in accordance with the indicators. The inverse functions correspond to the functions that are utilized for compressing motion information. The recovered counts may be provided to a video interface so that a user may view a representation of the movement of the pointing device.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
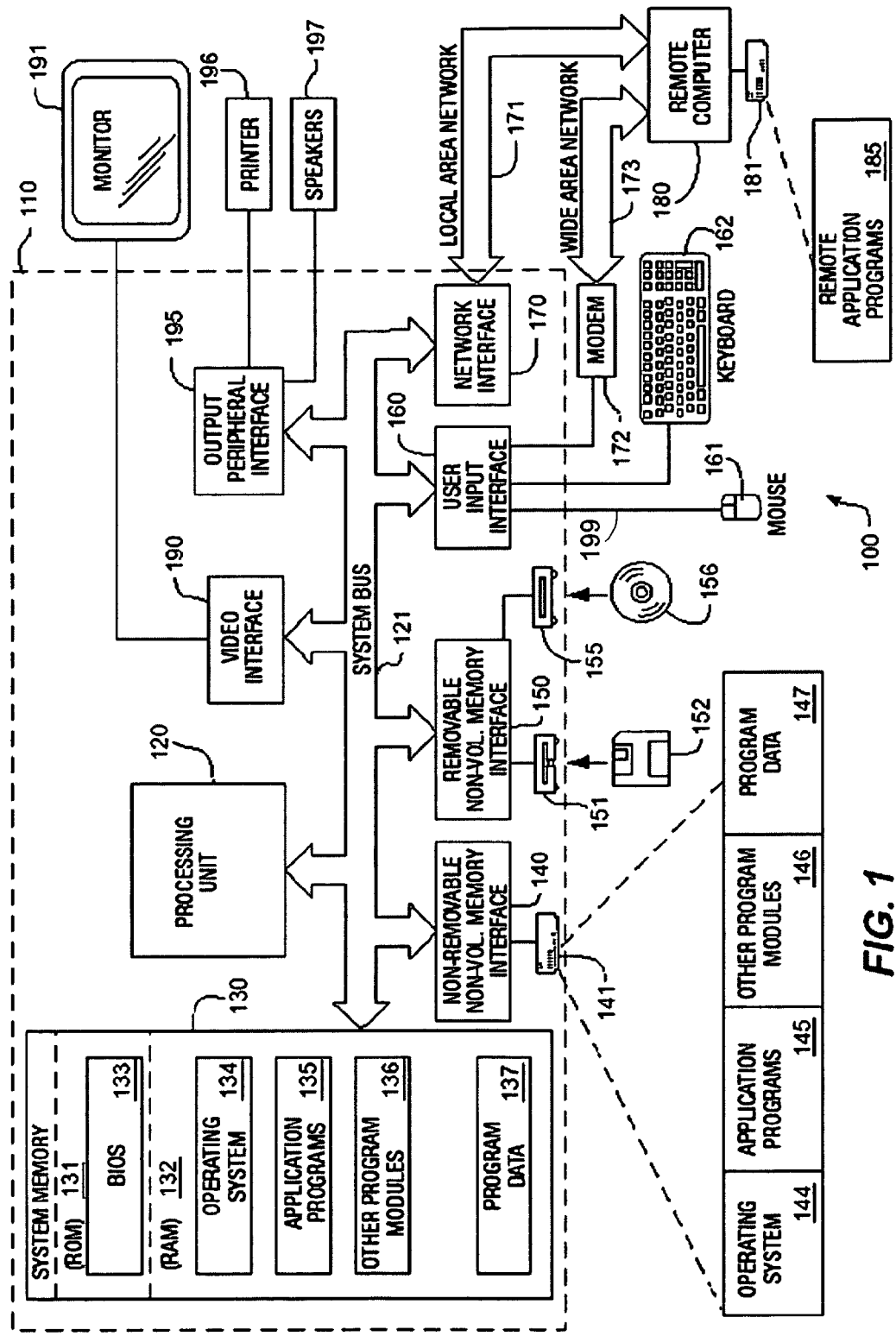
FIG. 1 illustrates an example of a suitable computing system environment on which the invention may be implemented.

FIG. 1 illustrates an example of a suitable computing system environment 100 on which the invention may be implemented. In particular, FIG. 1 shows an operation of a wireless pointer device 161, e.g. an optical wireless mouse, in the context of computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad. In an embodiment of the invention, wireless pointing device 161 may be implemented as a mouse with an optical sensor for detecting movement of the mouse. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). In FIG. 1, wireless pointer 161 communicates with user input interface 160 over a wireless channel 199. Wireless channel 199 utilizes an electromagnetic signal, e.g., a radio frequency (RF) signal, an infrared signal, or a visible light signal. A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
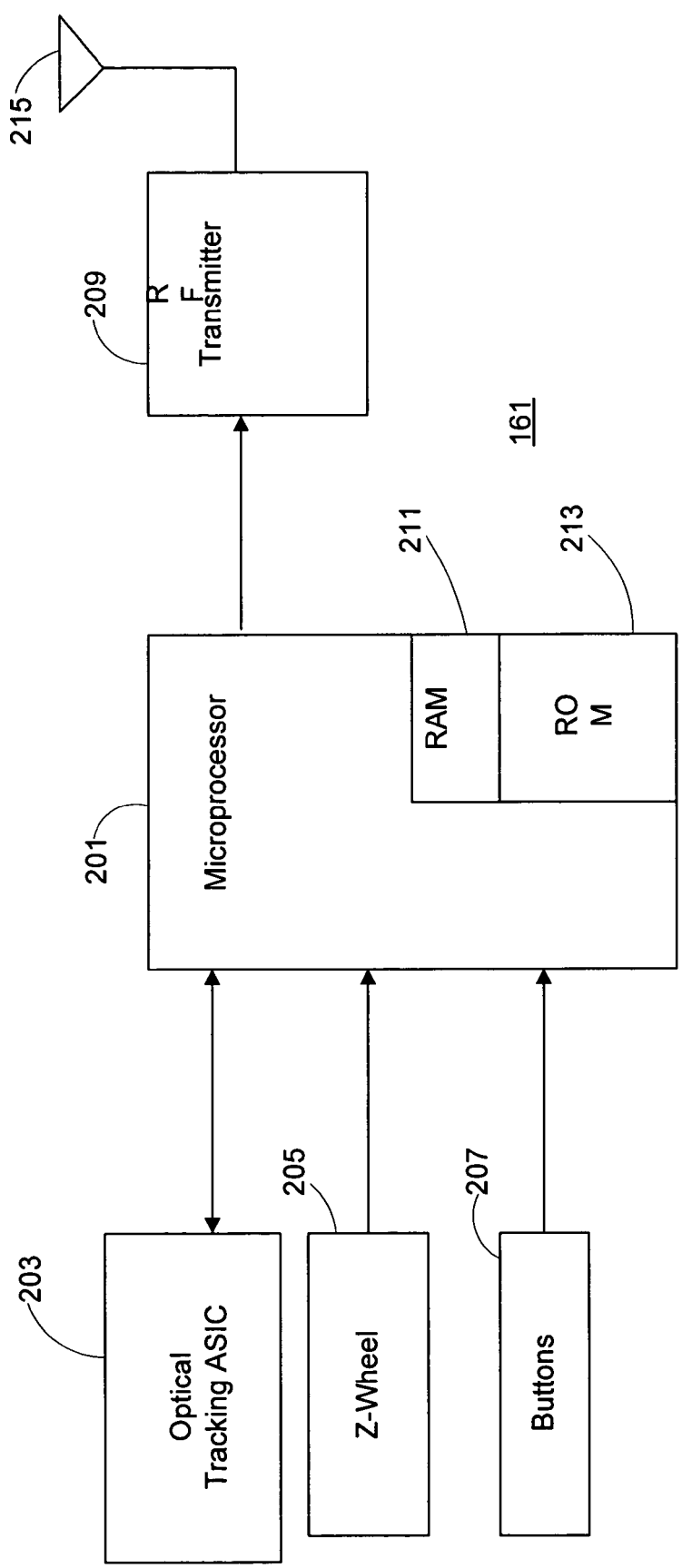
FIG. 2 shows an architecture of a wireless mouse in accordance with an embodiment of the invention.

FIG. 2 shows an architecture of a wireless mouse 161 in accordance with an embodiment of the invention. A tracking detector 203 tracks a movement of mouse 161 with a motion sensor and provides motion information to a microprocessor 201. Motion information may be represented as "dots", where a dot is represents incremental movement ($\Delta X, \Delta Y$) of mouse 161 in a x-dimension and a y-dimension, respectively. In an embodiment of the invention, tracking detector 203 utilizes an optical sensor and may have a resolution of 400 dpi (dots per inch) with a maximum speed of 50 inches per second (ips), although other embodiments may utilize other types of motion sensors with different characteristics. Also, a "Z-wheel" detector 205 provides information about scrolling and a buttons detector 207 obtains information about a user manipulating buttons (e.g. a left button and a right button) on mouse 161.

Mouse 161 accumulates $\Delta X, \Delta Y$ motion information from tracking detector 203 into 8 bit accumulators. Microprocessor 201 inserts the motion information into a packet data stream that is transmitted over a wireless channel by transmitter 209 through a transmitting antenna 215, in which each packet contains two 7-bit fields in order to provide displacement information for each of the two dimensions. In the embodiment, transmitter 209 operates on one of four RF channels at approximately 27 MHz with a 50 KHz bandwidth. However, variations of the embodiment may utilize different types of wireless channels and may operate with different center frequencies and bandwidths, including visible light spectra and infrared spectra.

In the embodiment, the packet data stream has a structure in which 7 bits are allocated for motion information (comprising a count for each dimension) corresponding to each dimension, corresponding to ($\Delta X, \Delta Y$) that are counted during each sampling interval (e.g. 20 msec). For example, with a report rate of a wireless universal serial bus (USB) interface, RF packets are typically shorter than 8 msec. Limiting the packet duration ensures that every USB report can be filled with motion data, thus generating a smooth motion on a video screen. Mouse 161 reduces the time latency to a latency that is comparable to that of a standard wired mouse. Limiting the duration of a packet helps reduce the time latency associated with viewing the movement of the wireless pointer. However, without a transformation (compression) of the motion information, more than 7 bits may be necessary for representing information in each dimension. (Transformation of the motion information is discussed in the context of FIGS. 3-6 as discussed later.)

Figure 3:
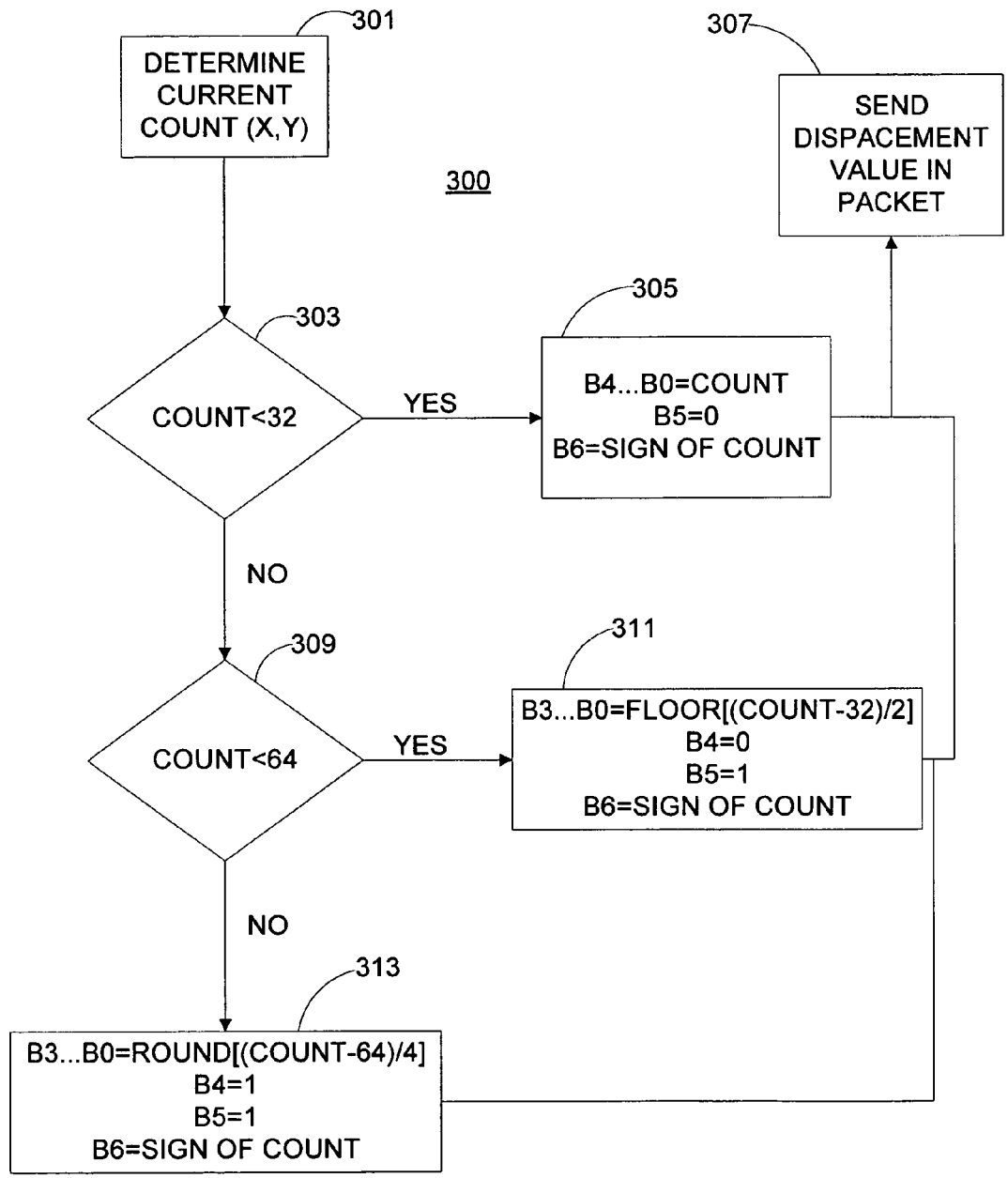
FIG. 3 is a flow diagram for compressing motion information from a wireless pointer device to a computing system in accordance with an embodiment of the invention.

FIG. 3 is a flow diagram 300 for compressing motion information from a wireless pointer device (e.g. mouse 161) to computer 110 in accordance with an embodiment of the invention. $\Delta X, \Delta Y$ values in the range of [−127 . . . +127] use only 7 bits for each sampling period, corresponding to a packet transmission by transmitter 209. One bit is used for a sign component, 4 or 5 bits are used to contain precision information (a numerical component), while the remaining bits (one or two) are flags indicating how to process the numerical value contained in the precision information. Table 1 shows a first exemplary embodiment for compressing motion information from tracking detector 203, corresponding to flow diagram 300.

TABLE 1

FIRST EXEMPLARY EMBODIMENT FOR COMPRESSING MOTION INFORMATION

| Bit 5 | Bit 4 | Bit 3210 | Used if | How count is encoded | Max. error [counts] | Max. error [%] |
|---|---|---|---|---|---|---|
| 0 | $b_4$ | $b_3b_2b_1b_0$ | count = 0 . . . 31 | $b_4b_3b_2b_1b_0$ | 0 | 0 |
| 1 | 0 | $b_3b_2b_1b_0$ | count = 32 . . . 63 | $b_3b_2b_1b_0$ = floor [(count − 32)/2] | 1 | 3 |

TABLE 1-continued

FIRST EXEMPLARY EMBODIMENT FOR COMPRESSING MOTION INFORMATION

| Bit 5 | Bit 4 | Bit 3210 | Used if | How count is encoded | Max. error [counts] | Max. error [%] |
|---|---|---|---|---|---|---|
| 1 | 1 | $b_3b_2b_1b_0$ | count = 64 ... 127 | $b_3b_2b_1b_0$ = round [(count − 64)/4] | 2 | 3 |

Table 1 shows a maximum percentage error corresponding to the compression of a count. In the example of the embodiment, the maximum error does not exceed 3% of a count. Bit 6 (not shown in Table 1) is used for sign, following a simple convention (e.g., bit 6=0 means positive displacement and bit 6=1 means negative displacement). Alternatively, the numbers can be represented in 2's complement format (bits 6 ... 0). As illustrated in Table 1, larger errors are generally associated with larger displacements. However, a larger displacement is associated with a faster motion of pointer device 161. Typically, a user's tolerance to error increases with a faster motion of pointer device 161.

With flow diagram 300, each count for each dimension is processed so that only 7 bits are required for representing displacement information in each packet of the packet data stream. Each displacement value comprises a sign component (corresponding to the direction of movement in a given dimension), a numerical component (corresponding to a magnitude of the movement), and a flag component (corresponding to an indicator for processing the magnitude component at user input interface 160. In step 301, counts (corresponding to a first count for the x-dimension and a second count corresponding to a second count for the y-dimension) are obtained from tracking detector 203 and are provided to microprocessor 201. In step 303, if the count is less than 32, the numerical component (bits 4, 3, 2, 1, and 0) is equated to the count. Also, the flag component comprises bit 5 and is set to '0'. In step 309, if the count is less than 64 and greater than 32, step 311 is executed in which the numerical component (bits 3, 2, 1, and 0) is equated to:

$$\text{floor}((\text{count}-32)/2) \quad (\text{EQ. 1})$$

where the "floor" function truncates the argument to the integer value. As an example, if the count equals 39, floor((39−32)/2)=floor(7/2)=3. A scaling factor and an offset may be associated with a compression function. For example, in EQ. 1, the corresponding scaling factor is equal to 2 and the corresponding offset is equal to 32. Also, the flag component comprises bits 4 and 5, which are set to '0' and '1', respectively. If the count is equal to greater than 64, step 313 is executed in which the numerical component is equated to:

$$\text{round}((\text{count}-64)/4) \quad (\text{EQ. 2})$$

where the "round" function rounds the argument to the nearest integer value. As an example, if the count equals 103, round((103−64)/4)=round(39/4)=10. Also the flag component comprises bits 4 and 5, both of which are set to '1'. Also, in some embodiment, scrolling information from detector 205 ("Z wheel") may be processed in a similar manner as motion information (ΔX,ΔY) in accordance with flow diagram 300.

Figure 4:
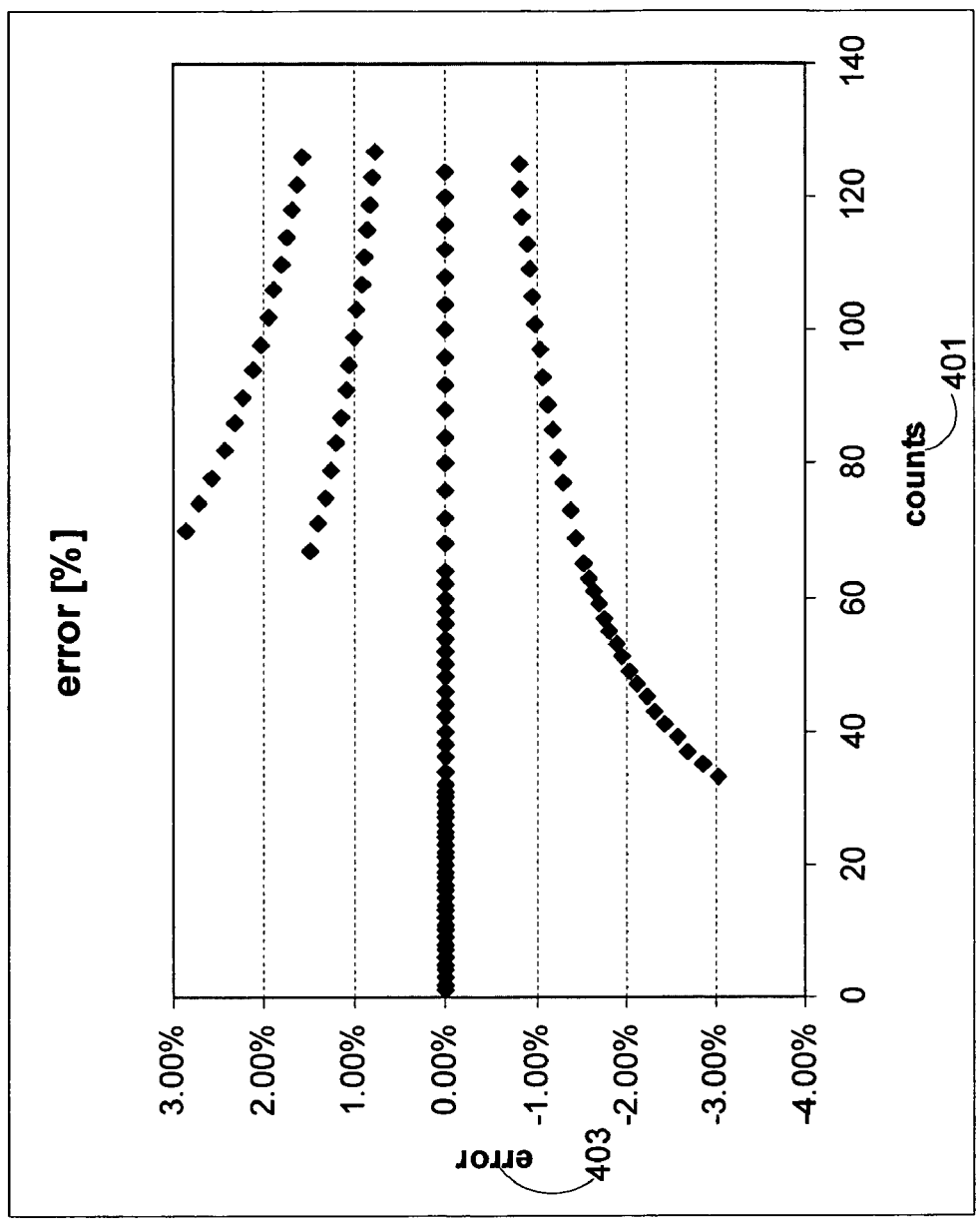
FIG. 4 shows an error window corresponding to the flow diagram shown in FIG. 3.

FIG. 4 shows an error window corresponding to flow diagram 300 as shown in FIG. 3, in which a percentage error 403 is plotted in relation to a count 401 that is determined by tracking detector 203. Percentage error 403 relates the error between count 401 and the recovered count after the converting the displacement value from the packet data stream to the recovered count. As shown in FIG. 4, the maximum percentage error is approximately 3%. Percentage error 403 is dependent upon count 401, where the maximum percentage error decreases with an increase of count 401.

The process of converting the displacement value can be illustrated by the examples that were previously discussed. With a count equal to 39, the corresponding numerical component is 3 (0011b). Additionally, a flag component is included so that the numerical component can be properly converted. In this case, the numerical component is converted using the inverse function:

$$2*(\text{numerical component})+32 \quad (\text{EQ. 3})$$

Substituting into EQ. 3, one determines that the recovered count is 38, while the count is equal to 39. The resulting recovered count has an error of one count or approximately 2.5%. With a count equal to 103, the corresponding numerical component is 10 (1010b). Additionally, a flag component is included so that the numerical component can be properly converted. In this case, the numerical component is converted using the inverse function:

$$4*(\text{numerical component})+64 \quad (\text{EQ. 4})$$

Substituting into EQ. 4, one determines that the recovered count is 104, while the actual count is 103. The resulting recovered count has an error of one count or approximately 1%.

Figure 5:
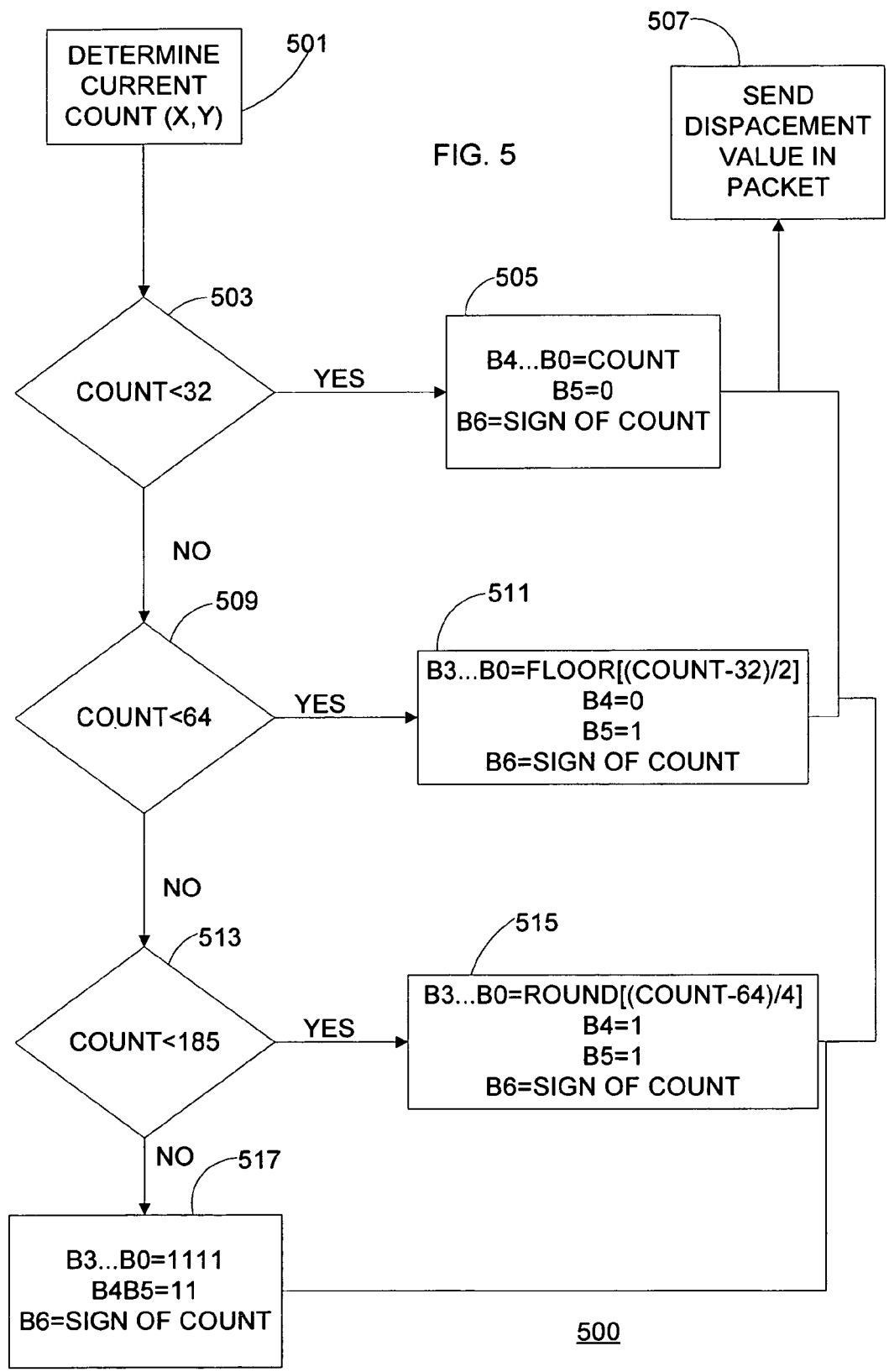
FIG. 5 shows a second flow diagram for compressing motion information from a wireless pointer device to a computing system in accordance with an embodiment of the invention.

FIG. 5 shows a flow diagram 500 for compressing motion information from a wireless pointer device (e.g. mouse 161) to computer 110 in accordance with a variation of the embodiment of the invention. ΔX,ΔY values in the range of [−184 ... +184] use only 7 bits for each sampling period, corresponding to a packet transmission by transmitter 209. One bit is used for a sign component, 4 or 5 bits are used to contain precision information (a numerical component), while the remaining bits (one or two) are flags indicating how to process the numerical value contained in the precision information. Table 2 shows a second exemplary embodiment for compressing motion information from tracking detector 203 that corresponds to flow diagram 500.

TABLE 2

SECOND EXEMPLARY EMBODIMENT FOR COMPRESSING
MOTION INFORMATION

| Bit 5 | Bit 4 | Bit 3210 | Used if | How count is encoded | Max. error [counts] | Max. error [%] |
|---|---|---|---|---|---|---|
| 0 | $b_4$ | $b_3b_2b_1b_0$ | count = 0 ... 31 | $b_4b_3b_2b_1b_0$ | 0 | 0 |
| 1 | 0 | $b_3b_2b_1b_0$ | count = 32 ... 63 | $b_3b_2b_1b_0$ = floor [(count − 32)/2] | 1 | 3 |
| 1 | 1 | $b_3b_2b_1b_0$ | count = 64 ... 184 | $b_3b_2b_1b_0$ = round [(count − 64)/8] | 4 | 5.9 |
| 1 | 1 | 1111 | count > 184 | | | |

With flow diagram 500, each count for each dimension is processed so that only 7 bits are required for representing displacement information in each packet of the packet data stream. Each displacement value comprises a sign component (corresponding to the direction of movement in a given dimension), a numerical component (corresponding to a magnitude of the movement), and a flag component (corresponding to an indicator for processing the magnitude component at user input interface 160. In step 501, counts (corresponding to a first count for the x-dimension and a second count corresponding to the y-dimension) are obtained from tracking detector 203 are provided to microprocessor 201. In step 503, if the count is less than 32, the numerical component (bits 4, 3, 2, 1, and 0) is equated to the count. Also, the flag component comprises bit 5 and is set to 'O'. In step 309, if the count is less than 64 and greater than 32, step 511 is executed in which the numerical component (bits 3, 2, 1, and 0) is equated to:

$$\text{floor}((\text{count}-32)/2) \qquad \text{(EQ. 5)}$$

where the "floor" function truncates the argument to the integer value. As an example, if the count equals 39, floor((39−32)/2)=floor(7/2)=3. Also, the flag component comprises bits 4 and 5, which are set to 'O' and '1', respectively. If the count is equal or greater than 64, step 513 is executed. If the count is less than 185, step 515 is executed in which the numerical component is equated to:

$$\text{round}((\text{count}-64)/4) \qquad \text{(EQ. 6)}$$

where the "round" function rounds the argument to the nearest integer value. As an example, if the count equals 103, round((103−64)/4)=round(39/4)=10 (1010b). Also the flag component comprises bits 4 and 5, both of which are set to '1'. If the count is greater than or equal to 185, step 517 is executed in which the numerical component and flag component are set to all 1's.

As with the first example that was previously discussed, the displacement value is converted into a recovered count that is approximately equal to the count, as provided by tracking detector 203, by utilizing an approximate inverse function at computer 110.

Figure 6:
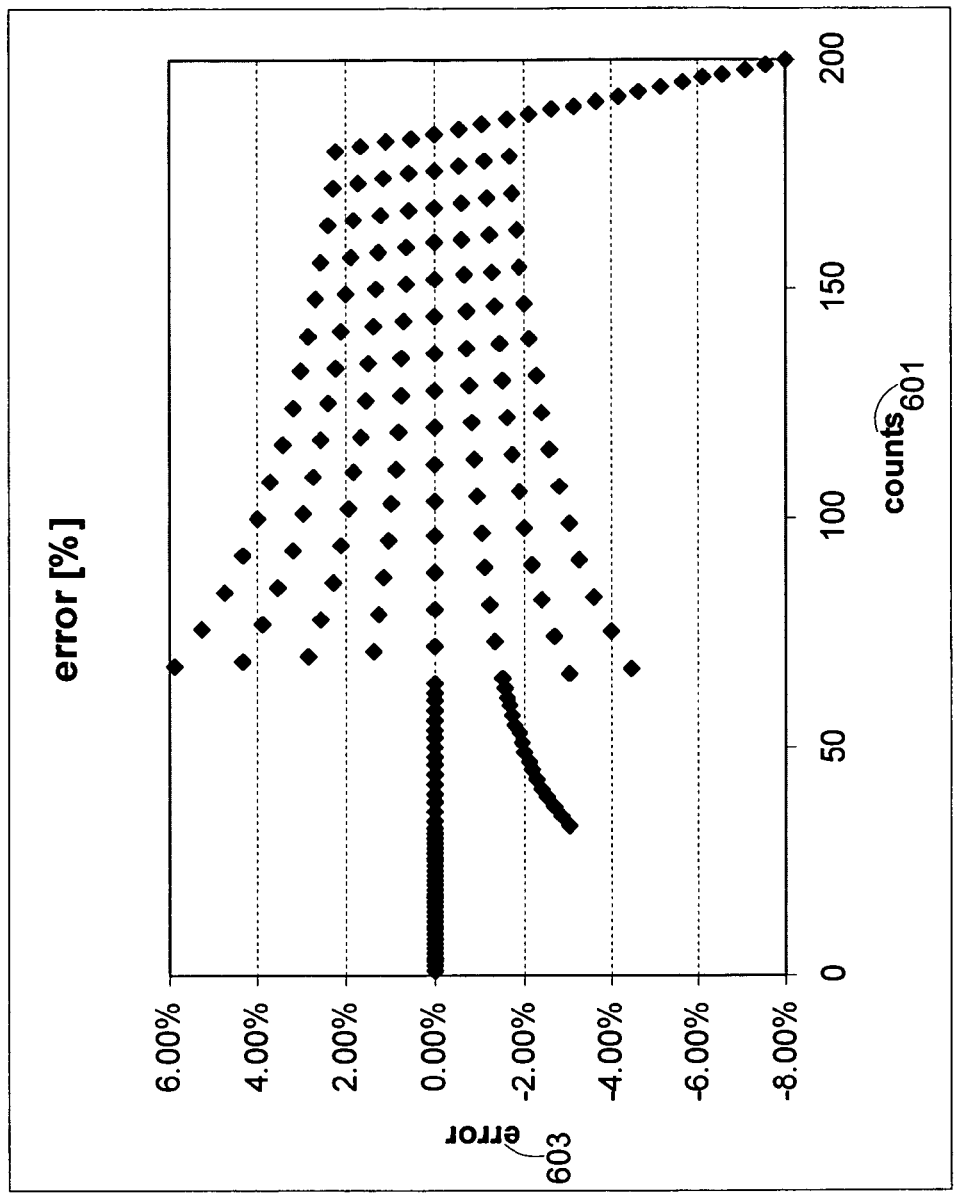
FIG. 6 shows an error window corresponding to the flow diagram shown in FIG. 5.

FIG. 6 shows an error window corresponding to flow diagram 500 as shown in FIG. 5, in which a percentage error 603 is plotted in relation to a count 601. Percentage error 603 relates the error between count 601 and the recovered count after the converting the displacement value from the packet data stream to the recovered count. As shown in FIG. 4, the maximum percentage error is approximately 4%. Percentage error 603 is dependent upon count 601, where the maximum percentage error decreases with an increase of count 601.

Comparing FIG. 6 with FIG. 4, one observes that the maximum percentage error that is associated with the second exemplary embodiment is slightly larger than with the first exemplary embodiment (4% vs. 3%). A reason for the larger maximum percentage error is that the second exemplary embodiment corresponds to a greater degree of compression than the first exemplary embodiment. Typically, compression (scaling) parameters are selected so that the packet data stream can accommodate the motion information that needs to be transported to computer 110. Moreover, other embodiments may utilize a different number of compression functions and inverse functions in order to limit a maximum percentage error.

Figure 7:
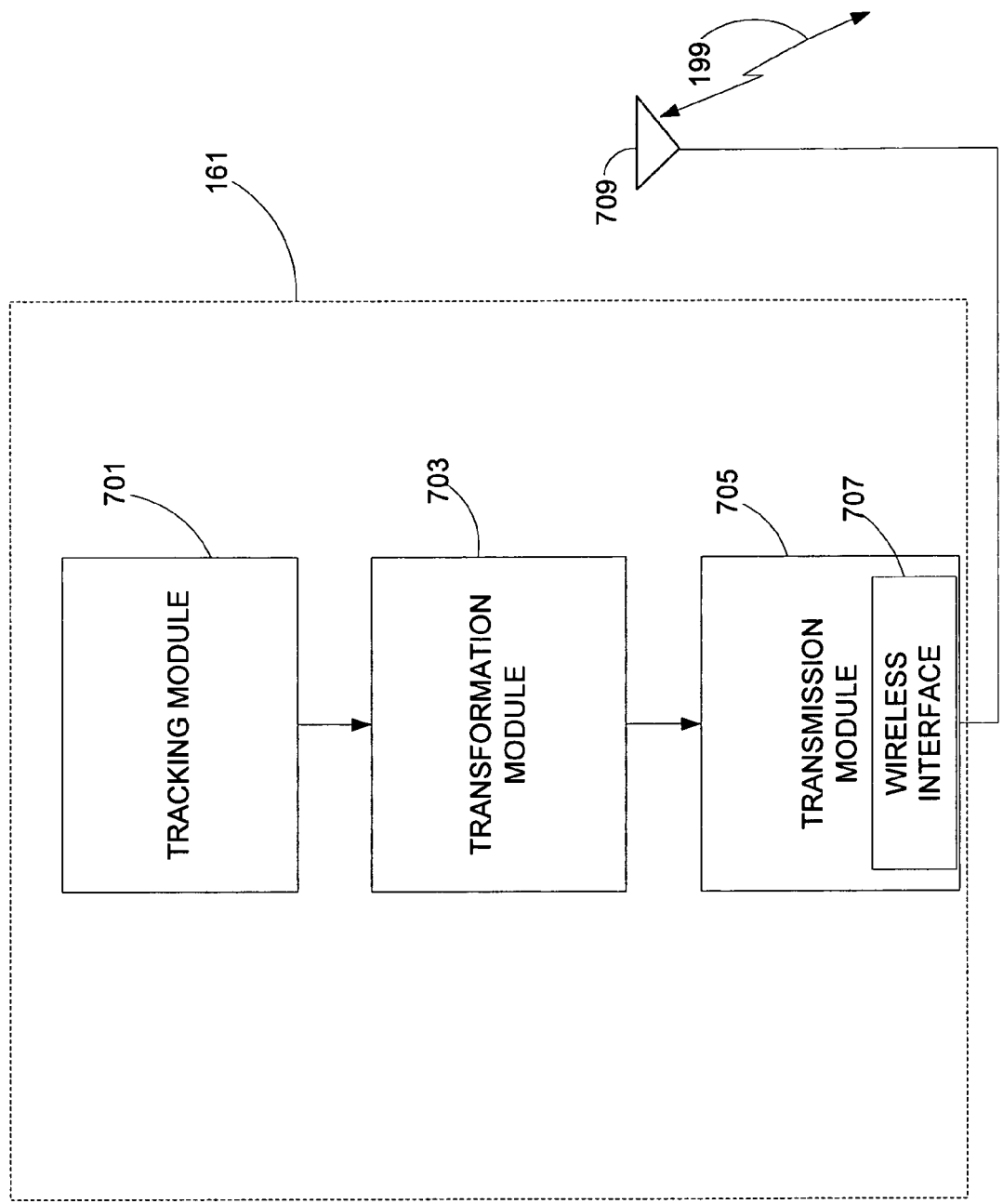
FIG. 7 shows a functional diagram of a wireless mouse in accordance with an embodiment of the invention.

FIG. 7 shows a functional diagram of wireless mouse 161 in accordance with an embodiment of the invention. A tracking module 701 obtains motion information about wireless mouse 161. In the embodiment, some functionality of tracking module is assumed by tracking detector 203 as shown in FIG. 2. Tracking detector 203 may be implemented with an application specific integrated circuit (ASIC), although with other embodiments, the functionality of tracking module 203 may be assumed, entirely or partially, by discrete logic circuitry or by a processor such as microprocessor 201. In the embodiment, tracking detector 701 uses an optically coupled motion sensor to detect incremental movement in both the x-dimension and the y-dimension. Tracking detector 701 accumulates counts for the two dimensions until sampled by a transformation module 703. In the embodiment, transformation module 703 is assumed by microprocessor 201. Transformation module 703 processes counts from tracking module 701 to form displacement values as discussed in the context of flow diagrams 300 and 500, although other embodiments of the invention may utilize other scaling parameters so that the packet data stream can accommodate the motion information from tracking module 701. The displacement value is incorporated in the packet data stream by transmission module 705, which transmission module 705 subsequently transmits the packet data stream through wireless interface 707 and transmitting antenna 709. In the embodiment, transmission module 705 utilizes one of four wireless channels, where each channel has an approximate 50 KHz bandwidth at approximately 27 MHz.

Figure 8:
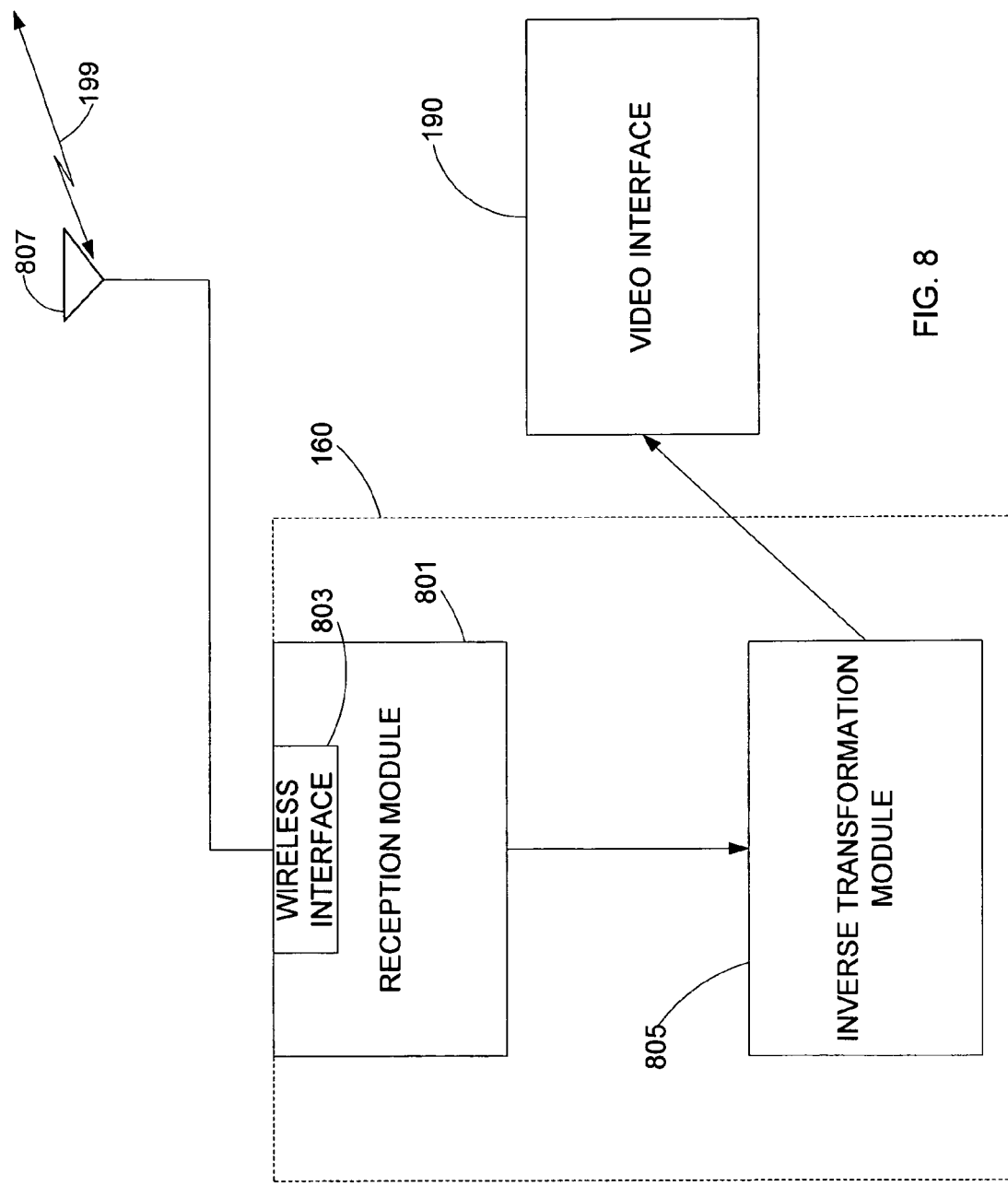
FIG. 8 shows a functional diagram of a user interface that receives motion information from the wireless pointer device that is shown in FIG. 7.

FIG. 8 shows a functional diagram of user input interface 160 that receives motion information from wireless mouse 161 that is shown in FIG. 7. A reception module 801 receives motion information from wireless mouse 161 (as transmitted by transmission module 703 through transmission module 705 as shown in FIG. 7) through a receiving antenna 807 and a wireless interface 803. Reception extracts displacement values from the packet data stream and presents the displacement values to an inverse transformation module 805. Inverse transformation module 805 converts the displacement values into recovered counts utilizing appropriate inverse functions. Inverse transformation module 805 presents the recovered counts to video interface 190 so that a user can observe a representation of the movement of wireless mouse 161 on monitor 191.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A wireless pointer system for communicating motion information of a wireless pointer device with a packet data stream, the packet data stream data transported on a wireless channel, the wireless pointer system comprising:
a tracking module operative to determine a tracking count, wherein the tracking count is associated with a movement of the wireless pointer device in a first dimension, and wherein the tracking count comprises an original number of bits;
a transformation module that is connected to the tracking module and is operative to receive the tracking count from the tracking module, the transformation module being configured to compress, based on at least one threshold value, the tracking count to form a displacement value in order for the packet data stream to accommodate the motion information, wherein the transformation module being operative to compress the tracking count comprises the transformation module being operative to:
determine whether the tracking count exceeds the at least one threshold value wherein the transformation module being operative to determine whether the tracking count exceeds the at least one threshold value further comprises the transformation module being operative to determine whether the tracking count is greater than 32 and less than 64, and
in response to determining that the tracking count exceeds the at least one threshold value, convert the tracking count into a 7-bit representation according to a compression formula associated with a range of the tracking count, wherein the transformation module being operative to convert the tracking count into the 7-bit representation further comprises the transformation module being operative to convert the tracking count into a numerical component of the 7-bit representation according to the formula floor ((count−32)/2), wherein the offset factor is 32 and the scaling factor is 2 wherein the transformation module being operative to convert the tracking count into the 7-bit representation according to the compression formula associated with the range of the tracking count comprises the transformation module being operative to:
deduct an offset factor from the tracking count,
divide the deducted tracking count by a scaling factor, and
represent the deducted and divided tracking count in a portion of the 7-bit representation; and
a transmission module that is coupled to a transmitting antenna and that transmits the packet data stream over the wireless channel.

2. The wireless pointer system of claim 1, wherein the transmitting antenna is integrated with the wireless pointer system.

3. The wireless pointer system of claim of claim 1, further comprising:
a reception module that is coupled to a receiving antenna operative to receive the packet data stream over the wireless channel and extract the displacement value from the packet data stream; and
an inverse transformation module that is connected to the reception module operative to obtain the displacement value from the packet data stream and convert the displacement value to a recovered count, wherein the recovered count approximately equals the tracking count.

4. The wireless pointer system of claim 1, wherein a frequency spectrum of the wireless channel is selected from the group consisting of a radio frequency (RF) spectrum, an infrared spectrum, and a visible light spectrum.

5. The wireless pointer system of claim 1, wherein a frequency spectrum of the wireless channel has a center frequency of approximately 27 MHz and a bandwidth of approximately 50 KHz.

6. The wireless pointer system of claim 1, wherein the wireless pointer device is selected from the group consisting of a mouse, a trackball, and a touch pad.

7. A computer storage medium having a set of instructions which when executed performs a method for encoding information representing wireless device movement information, the method executed by the set of instructions comprising:
determining a number of counts that represent a movement of a wireless pointer device wherein determining the number of counts that represent the movement of the wireless pointer device comprises determining whether the tracking count is greater than 32 and less than 64;
selecting an encoding scheme that is based on the determined number of counts, wherein the encoding scheme comprises a plurality of functions each associated with a distinct range of the determined number of counts; and
encoding the determined number of counts based on the selected encoding scheme into a 7-bit representation of the determined number of counts comprising a sign component, a flag component, and a numerical component, wherein encoding the determined number of counts based on the selected encoding scheme into the 7-bit representation of the determined number of counts comprises:
setting the flag component to a value indicating that the determined number of counts is within the distinct range associated with the encoding scheme, and
converting the determined number of counts into a binary representation as the numerical component of the 7-bit representation, wherein converting the determined number of counts into the binary representation as the numerical component of the 7-bit representation comprises using the encoding scheme comprising a formula of floor((count−32)/2) wherein the offset factor is 32 and the scaling factor is 2 wherein converting the determined number of counts into the binary representation comprises:
deducting the offset factor from the tracking count by, and
dividing the deducted tracking count by the scaling factor.

8. The wireless pointer system of claim 1, wherein the transformation module being operative to determine whether the tracking count exceeds the at least one threshold value further comprises the transformation module being operative to determine whether the tracking count is greater than 63, and wherein the transformation module being operative to convert the tracking count into the 7-bit representation further comprises the transformation module being operative to convert the tracking count into a numerical component of the 7-bit representation according to the formula round((count−64)/4), wherein the offset factor is 64 and the scaling factor is 4.

9. The computer storage medium of claim 7, further comprising:
associating the determined number of counts with the distinct range of a plurality of count ranges.

10. The computer storage medium of claim 7, further comprising:
utilizing a positive number of counts to represent movement of the wireless pointer device in a first direction; and
utilizing a negative number of counts to represent movement of the wireless pointer device in a second direction opposite to the first direction.

11. The computer storage medium of claim 10, further comprising:
encoding the sign component of the 7-bit binary representation based on one of the first direction and the second direction.

12. The computer storage medium of claim 7, wherein determining the number of counts that represent the movement of the wireless pointer device comprises determining whether the tracking count is greater than 63 and less than 185, and wherein converting the determined number of counts into the binary representation as the numerical component of the 7-bit representation comprises using the encoding scheme comprising a formula of round((count−64)/8)), wherein the offset factor is 64 and the scaling factor is 8.

13. The computer storage medium of claim 7, further comprising:
transmitting the encoded tracking count via a wireless channel.

14. The wireless pointer system of claim 1, wherein the 7-bit representation comprises a sign component, a flag component, and a numerical component.

15. A computer storage medium having a set of instructions which when executed performs a method for encoding information representing wireless device movement information, the method executed by the set of instructions comprising:
determining a number of counts that represent a movement of a wireless pointer device;
selecting an encoding scheme that is based on the determined number of counts, wherein the encoding scheme comprises a plurality of functions each associated with a distinct range of the determined number of counts;
associating a plurality of encoding formulas with a plurality of ranges associated with the determined number of counts;
determining whether the tracking count is greater than 63 and less than 185; and
in response to determining that the tracking count is greater than 63 and less than 185, using an encoding scheme comprising a formula of round((count−64/8).

16. A wireless pointer system for communicating motion information of a wireless pointer device with a packet data stream, the packet data stream data transported on a wireless channel, the wireless pointer system comprising:
a tracking module operative to determine a tracking count, wherein the tracking count is associated with a movement of the wireless pointer device in a first dimension, and wherein the tracking count comprises an original number of bits;
a transformation module that is connected to the tracking module and is operative to receive the tracking count from the tracking module, the transformation module being configured to compress, based on at least one threshold value, the tracking count to form a displacement value in order for the packet data stream to accommodate the motion information, wherein the transformation module being operative to compress the tracking count comprises the transformation module being operative to:
determine whether the tracking count exceeds the at least one threshold value wherein the transformation module being operative to determine whether the tracking count exceeds the at least one threshold value further comprises the transformation module being operative to determine whether the tracking count is greater than 63, and
in response to determining that the tracking count exceeds the at least one threshold value, convert the tracking count into a 7-bit representation according to a compression formula associated with a range of the tracking count wherein the transformation module being operative to convert the tracking count into the 7-bit representation further comprises the transformation module being operative to convert the tracking count into a numerical component of the 7-bit representation according to the formula round((count−64)/4), wherein the offset factor is 64 and the scaling factor is 4 wherein the transformation module being operative to convert the tracking count into the 7-bit representation according to the compression formula associated with the range of the tracking count comprises the transformation module being operative to:
deduct the offset factor from the tracking count,
divide the deducted tracking count by the scaling factor, and
represent the deducted and divided tracking count in a portion of the 7-bit representation; and
a transmission module that is coupled to a transmitting antenna and that transmits the packet data stream over the wireless channel.

* * * * *